(No Model.)
J. MARTIGNONI.
MECHANISM FOR DRIVING WHEELED VEHICLES.
No. 398,899. Patented Mar. 5, 1889.
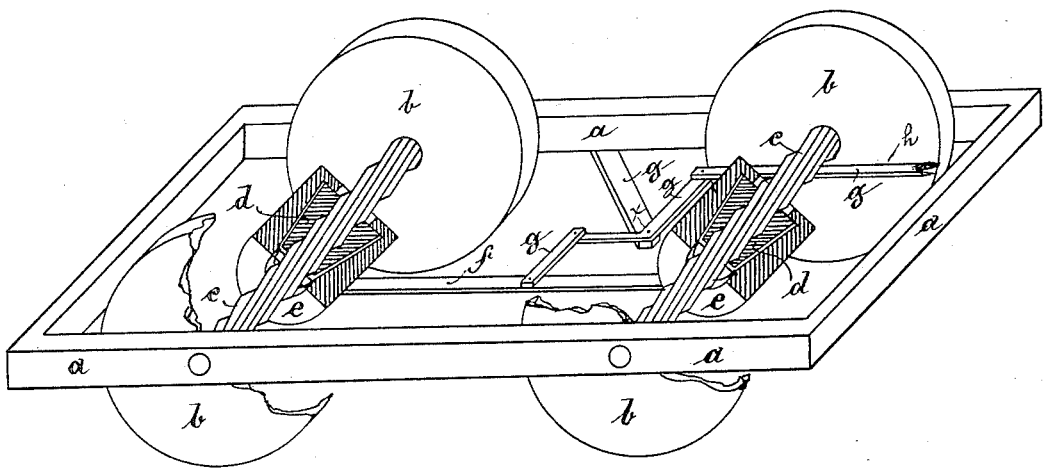

United States Patent Office.

JOHANNES MARTIGNONI, OF FRANKFORT-ON-THE-MAIN, PRUSSIA, GERMANY.

MECHANISM FOR DRIVING WHEELED VEHICLES.

SPECIFICATION forming part of Letters Patent No. 398,899, dated March 5, 1889.

Application filed October 22, 1888. Serial No. 288,846. (No model.)

*To all whom it may concern:*

Be it known that I, JOHANNES MARTIGNONI, a subject of the King of Prussia, residing at the city of Frankfort-on-the-Main, in the Kingdom of Prussia, German Empire, have invented certain new and useful Mechanism for the Mechanical Driving of Wheeled Vehicles; and I do hereby declare that the following is a full, clear, and exact description of the invention, which will enable others skilled in the art to which it appertains to make and use the same.

My invention relates to mechanism for the mechanical driving of wheeled vehicles; and the object of my invention is to communicate rotary motion to the wheels of the same by working screw-nuts over the axles on which the wheels are fixed. I attain this object by mechanism such as is shown in the accompanying drawing in horizontal part sectional view.

In the frame $a$ of the body of the vehicle are mounted the axles $c$, on which wheels $b$ are firmly fixed. The axles $c$ are provided between the wheels with a very quick-threaded or quick-action screw, over which work correspondingly-screwed nuts carried in hollow frames $e$. The nuts $d$ are turned taper on the outside, and when required may be coupled by friction to the interior taper surface of hollow frames $e$. These latter are in connection with connecting-rods $f$, which in turn are in connection with driving-rods $h$, through double levers $g$, oscillating on points $x$.

To move the vehicle, one of the driving-rods $h$ is operated so as to communicate a sidewise to-and-fro motion to connecting-rod $f$, taking one hollow frame $e$ and one nut $d$ on each of the axles along with it. When traveling in the outward direction toward the respective wheels, the nuts $d$ will revolve in their frames without turning the axles, owing to the smallness of the friction between them; but upon the return-stroke of the nuts inward toward the central line of the vehicle the friction then taking place between the conical surfaces will fix the nuts in their frames and operate the turning of the axles and wheels. The nuts $d$ may be mounted so as to drive the vehicle either in their inward or outward stroke.

What I claim as my invention, and desire to secure by Letters Patent, is—

In wheeled vehicles, the combination of axles $c$, on which the wheels are fixed, nuts $d$, and frames $e$, with lever-connections $f$ $g$ $h$, for the purpose specified, substantially as described and shown.

In testimony whereof I signed this specification in the presence of two subscribing witnesses.

JOHANNES MARTIGNONI.

Witnesses:
 F. VON ROEDSEER,
 F. HOFFBAUER.